Figure 7:
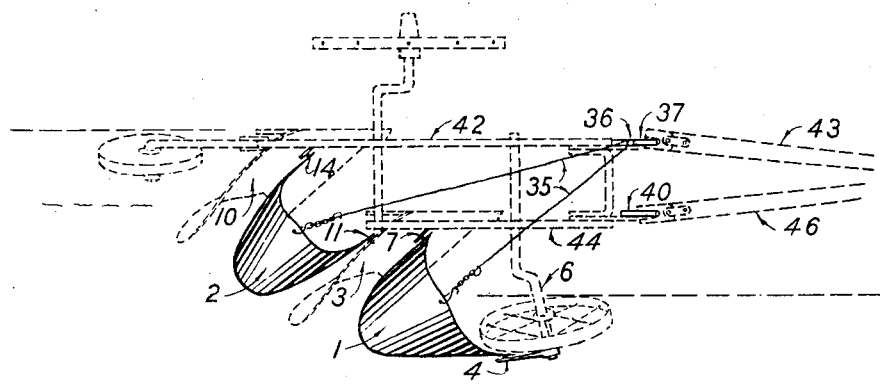

Oct. 10, 1933.   L. G. SCHOENLEBER ET AL   1,929,957
PLOW ATTACHMENT
Filed Feb. 24, 1933   2 Sheets-Sheet 1
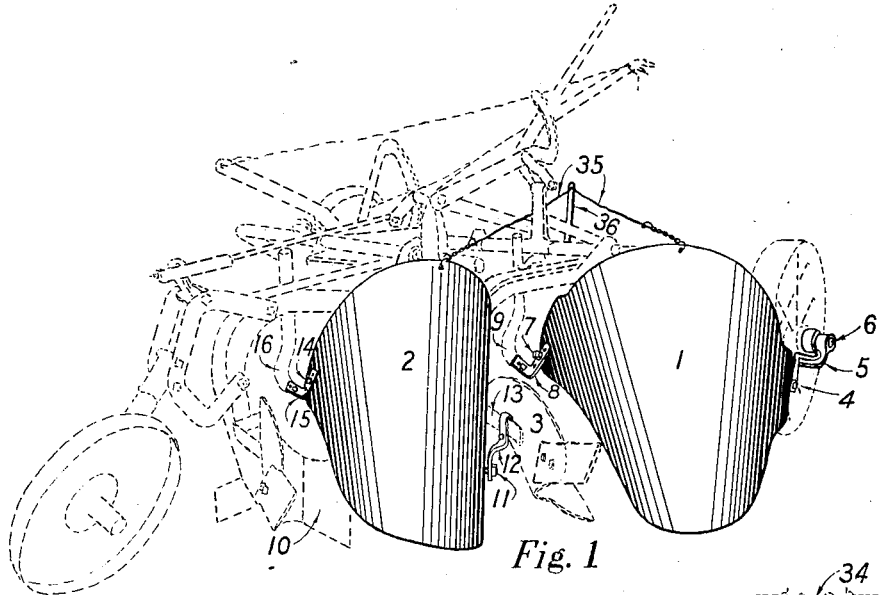
Fig. 1
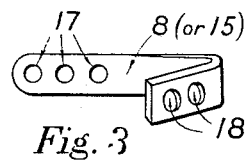
Fig. 3
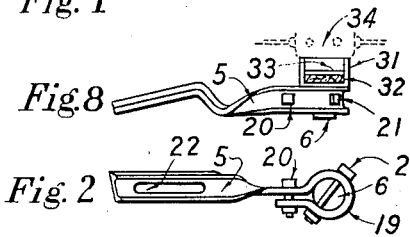
Fig. 8
Fig. 2
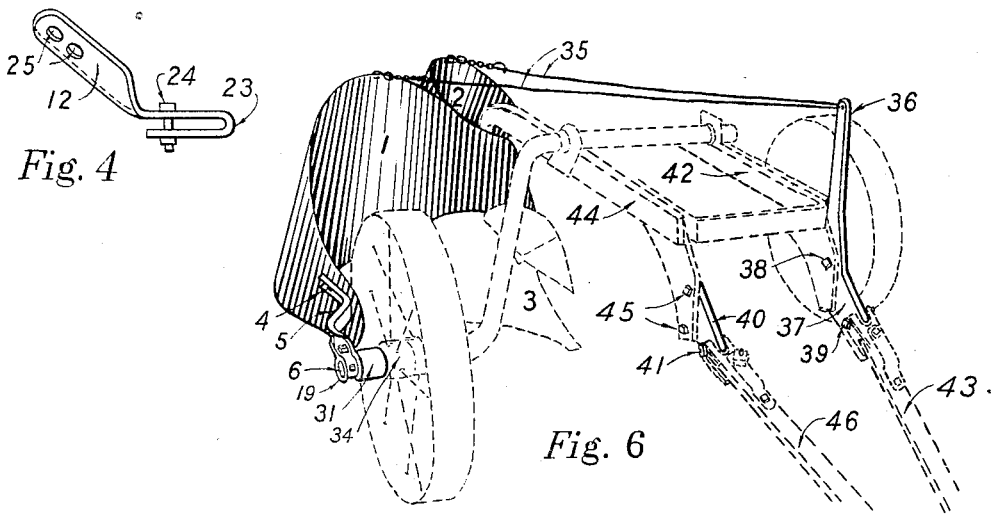
Fig. 4
Fig. 6
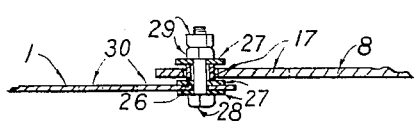
Fig. 5
Leonard G. Schoenleber
Archie H. Glaves   Inventors
per
*signature*
Attorney Patented Oct. 10, 1933

1,929,957

UNITED STATES PATENT OFFICE 1,929,957

PLOW ATTACHMENT

Leonard G. Schoenleber and Archie H. Glaves, Toledo, Ohio, dedicated to the free use of the Public Application February 24, 1933. Serial No. 658,378

2 Claims. (Cl. 97—193)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to us of any royalty thereon.

We hereby dedicate the invention herein described to the free use of the public, to take effect upon the granting of a patent to us.

Our invention relates particularly to an attachment for a plow, and has for its object a device for completely and effectively plowing under, and burying all vegetable growth on the soil, such as cornstalks, weeds, sweet clover, or remains from crops previously harvested, all of which will be included by the term "trash", as hereinafter used.

The complete covering and burial of all trash in plowing land is a method employed for the control of certain insect pests. Effective control by this method requires that trash harboring the pests shall be covered with a sufficient depth of soil to ensure that none of the material so covered will be brought to the surface or uncovered in subsequent harrowing and tilage operations on the soil.

In plowing, a strip of soil known as the "furrow slice" is sheared loose from the land by the plow, and is twisted and rolled over and deposited upside down in the open trench or "furrow" left by the removal of the furrow slice on the previous traverse of the field by the plow.

Various attachments for plows have been used for plowing under weeds and stubble growing on the soil, but where large volumes of trash are to be turned under, as for instance, when plowing under uncut cornstalks, devices heretofore used for this purpose have been found to have a tendency to become clogged with trash when unusually large masses of the latter are encountered or else to fail in forcing the trash far enough below the surface of the ground to permit it to be adequately buried.

Our invention provides a looped or U-shaped, freely rocking pivoted trash guide, for attachment to a plow, which guides and forces down into the open furrow all trash contained in the furrow slice and which constantly and automatically adjusts itself to the volume of trash encountered, rising as necessary to accommodate larger volumes of trash and falling again immediately when lesser volumes of trash are encountered, riding constantly on the trash and forcing it to the bottom of the furrow whether the volume of the trash be large or small, and holding it there until the furrow slice is overturned upon it.

This plow attachment or trash guide is so formed and pivoted that it completely encloses the space between the turning furrow slice and the preceding plow member, and yet provides adequate clearance for the free passage of heavy growths of stalks, or other plant growth, with greater freedom from clogging than with other plow attachments intended for a similar purpose, and at the same time will handle with equal facility and effectiveness any lesser volume of trash.

Our device which we desire to secure by Letters Patent is illustrated in the accompanying drawings in which Fig. 1 is a perspective rear view of the attachment mounted on a double bottom wheeled plow adapted to be drawn by a tractor;

Figs. 2, 3, 4, and 8 are typical forms of the brackets upon which the trash guides are pivoted;

Fig. 5 the method of pivoting the trash guides to the brackets;

Fig. 6 is a perspective front view of the attachment mounted on a plow similar to that shown in Fig. 1, showing the special hitch brackets which constitute a part of this attachment; and, Fig. 7 is a plan view of the structure shown in Figs. 1 and 6.

Similar numerals refer to similar parts throughout the several views.

Trash guides 1 and 2 are each formed preferably of a single piece of sheet metal, cut to a shape somewhat resembling that of a diamond or kite, with rounded corners. This sheet metal is bent to form a U-shaped loop, the bend being slightly conical in form and the sides converging slightly from the ends of the U toward the conical bend as shown in Figs. 1, 6 and 7.

Each trash guide is mounted (as shown in Figs. 1 and 6) in front of the moldboard of a plow bottom with the open end of the U facing obliquely forward, inward toward the plow beam, and downward and with its lower edge, on the side adjacent the moldboard, approximately parallel to the vertical portion of the moldboard and so adjusted in position that, in operation, it will make shearing contact with the surface of a furrow slice turned up by the plow bottom, and with the lower edge of the wide bent portion of the guide extending outward beyond the outer end of the moldboard, so that, in operation, it will project beyond the edge of a furrow slice turned by the plow bottom, and will overhang the open furrow alongside. The trash guide is pivoted, at the ends of the U to brackets adjustably clamped to the plow structure, as shown in Figs. 1, 6 and 7, in such manner that the height of the pivots on which the guide rocks may be adjusted so that, in operation, the pivots will be as near as possible to the surface of a furrow slice turned by the plow bottom, the position of the guide being adjustable further, by means of a series of holes in the narrow ends of the guide, and another series of holes in the brackets (Fig. 3), adapted to receive the bolt on which the guide pivots, any-one of which holes may be selected as the actual pivoting point. The side of the trash guide nearest the shin of the plow is pivoted on a bracket adapted to be attached either to the shank of the jointer, jointer substitute, coulter, or if necessary, to the plow beam itself. The side of the trash guide farthest from the shin of the plow is pivoted to a bracket adapted to be attached to either the moldboard brace, moldboard, furrow axle, or any other member of the plow adapted for its support, the particular form of the bracket used necessarily varying according to the type of plow, and the part of the plow to which it is to be attached.

In Fig. 1, trash guide 1, for the front plow bottom 3, is pivoted by means of assembly 4 (Fig. 5) to bracket 5, which is secured to the outer end of front furrow wheel axle 6. The other end of the trash guide 1 is pivoted by means of assembly 7 (Fig. 5) to a V-shaped bracket 8, secured to jointer shank 9 of the plow structure. Trash guide 2, for the rear plow bottom 10, is pivoted by means of assembly 11 (Fig. 5) to bracket 12, secured to moldboard brace 13 of the plow, and also is pivoted by means of assembly 14 (Fig. 5) to the V-shaped bracket 15, which is secured to the jointer shank 16 of the plow structure, as shown.

In Fig. 3, one end of the bracket 8 and/or 15 is provided with a plurality of holes 17 for pivot connection to the trash guide 1 and/or 2. The other end of the bracket 8 and/or 15 is provided with a plurality of holes 18 for adjustably clamping it to the jointer shank 9 and /or 16 (see Fig. 1).

Referring to Fig. 2, bracket 5, to which the trash guide 1 is pivoted on its outer or forward side, is formed at the forward end into a clamp 19, which encircles the outer end of the furrow wheel axle 6 and which is secured by means of clamp bolt 20. Bracket 5 is further secured against rotation on the furrow wheel axle 6 by means of bolt 21 which extends through both sides of the clamp 19 and through the axle 6. The other end of the bracket 5 is bent to the form shown, and is provided with a longitudinal slot 22 adapted to receive the trash guide pivot bolt assembly 4. Slot 22 is necessary in order to allow for the rearward movement of the furrow wheel axle 6 which, with this type of plow structure, occurs when the plow bottoms are lifted from the ground.

Bracket 12, shown in Fig. 4, is formed with a U-bend 23 at one end adapted to fit over moldboard brace 13 of the plow and is clamped to same by clamp bolt 24. The other end of the bracket 12 is shaped, as shown, and is provided with a plurality of holes 25 adapted to receive the pivot bolt assembly 11 of the trash guide 2.

Trash guides 1 and 2 are pivoted to the brackets 5, 8, 12 and 15, in the manner shown in Fig. 5, in which the end of the trash guide 1 is shown pivoted to the bracket 8. Bushing 26 and washers 27 are rigidly secured to the trash guide 1 by means of bolt 28 and double nuts 29. Bushing 26 is slightly longer than the thickness of the bracket 8 and the outside diameter of the bushing 26 is slightly less than the diameter of the hole 17 in bracket 8, so that the trash guide 1 swings freely upon these pivots. The ends of the trash guide 1 are provided with a plurality of holes 30 adapted to receive the bolt 28, any one of which holes may be selected as the pivot point as may be found necessary to best adapt the position of the trash guides to the conditions of operation.

In order to attach bracket 5 to the outer end of the furrow wheel axle 6, it is necessary to remove a grease cap (not shown), which normally covers the outer end of the axle. Furrow wheel dust collar 31, felt washer 32, and dust collar washer 33, shown in Fig. 8, mounted on the end of furrow wheel hub 34, serve to exclude dirt from the furrow wheel bearing (not shown), and leave the end of the furrow wheel axle 6 exposed for attaching clamp 19 of bracket 5 (see Figs. 2 and 6).

Trash guides 1 and 2, unless lifted above the ground, would be damaged when the plow structure is backed up. Lifting of the trash guides is accomplished automatically by the act of backing the plow, by means of trash guide lifting wires 35, (as shown in Figs. 1 and 6), which connect the trash guides to upper end of lever arm 36 on pivoted hitch bracket 37, shown in Figs. 1, 6 and 7. Hitch bracket 37 is pivoted by means of the bolt 38 to vertical clevis on the forward end of plow beam 42, carrying the rear plow bottom. Hitch bar 43 is connected by bolt 39. Lever arm 36 is kept seated against the end of plow beam 42, by the forward pull exerted on bolt 39, allowing lifting wires 35 to slacken and trash guides 1 and 2 to ride freely in contact with the furrow slice or on the trash. The backward pressure of hitch bar 43 against bolt 39 causes the upper end of lever arm 36 to swing forward and lift trash guides 1 and 2. Hitch bracket 40 is secured to the vertical clevis on plow beam 44 by means of bolts 45. Hitch bar 46 is pivoted by bolt 41 to hitch bracket 40. Hitch bracket 40 is provided in order to afford symmetrical points of attachment for hitch bars 43 and 46.

The operation of the trash guide or plow attachment is as follows:

As the plow moves forward, shearing off the furrow slice and upturning it, the loop shaped trash guide is drawn, open end forward against the standing stalks or other trash growing on the furrow slice, pushing the trash forward and outward and bending it downward to the bottom of the furrow as the lower edge of the trash guide is dragged over it. The overturning furrow slice falls on the trash immediately in the rear of the trash guide and buries the trash at the bottom of the furrow. The open forward end of the U-shaped trash guide covers the entire width of the furrow slice and the slightly converging sides of the guide tend to draw in toward the center of the trash guide any standing stalks or trash at either side of the furrow slice.

We have found that the scraping action of the lower inner edge of such a guide on the surface of the turning furrow slice, together with the rising and falling action of the rear portion of the trash guide, are of importance in effectively guiding, and in maintaining constant contact with and downward pressure upon the trash, for the purpose of forcing it well down into the open furrow and holding it there while the furrow slice is overturned upon it.

The effective performance of the guide requires that it shall be so mounted as to rock freely on an axis located in front of the guide, very near the surface of the furrow slice, and extending transversely to the relative direction of movement of the turning furrow slice with respect to the plow moldboard. Pivoting points near the surface of the furrow slice are necessary in order that the rearward frictional drag on the scraping edge of the guide, as the guide is drawn in a forward direction over the trash, shall have the least possible tendency to lift the guide, or cause it to swing upward, or jump over masses of trash encountered. The rearward frictional drag of the guide is thereby transmitted directly to, and taken upon the pivots, and thereby permitting practically the entire weight of the guide to effectively and constantly press upon the trash and force it down into the furrow. At the same time, leaving the guide entirely free to rock up or down, and not rearwardly as is the case with guides hinged or pivoted on an axis at some distance above the ground. This pivoting arrangement enables the guide to adjust itself to varying thickness of furrow slice or to varying quantities of trash encountered.

In plowing with a plow equipped with this attachment, the U-shaped trash guide forms, in effect, the side walls and roof of an arched "tunnel" spanning, at its forward end, the furrow slice, and extending obliquely rearwardly, outwardly and downwardly into the open furrow immediately in advance of the overturning furrow slice; and into and through which all trash on the surface of the furrow slice passes as the tunnel-like guide moves forward. The arched roof of the "tunnel" sharply converges down upon the trash as it emerges from the rear exit of the "tunnel" into the open furrow just as the furrow slice comes tumbling over upon it. The roof at the exit of the tunnel constantly and automatically adapts itself to the volume of trash emerging therefrom, rising only so much as is necessary in order to allow larger masses to pass, and promptly closing down again on smaller masses.

This attachment automatically adjusts itself to the size and quantity of the trash coming in contact with it.

While we have shown in our specification and drawings a two bottom plow structure equipped with our attachment, it is understood that our invention may be practiced by using equipment having one or more plow bottoms.

Having thus fully and clearly described our invention, what we claim as new and desire to secure by Letters Patent is:

1. The combination with a structure having a turning plow of an attachment comprising brackets; means for adjustably, detachably securing said brackets to said structure; a freely rocking U-shaped guide positioned in front of the plow moldboard and having the open end of the U facing obliquely forward, inward and downward, with its bottom edge, on the side nearest the moldboard, approximately parallel to the vertical portion of the same, and adapted to be so positioned as to make substantially shearing contact with the surface of an upturning furrow slice, and with the lower edge of its bent portion extending outwardly beyond the rear end of the plow moldboard; pivots mounted on the ends of said guide adapted to engage said brackets; means for adjusting the position of said pivots on said guide; means for adjusting the position of said pivots on said brackets; and means for raising said guides.

2. A trash guide, comprising a looped plate with its middle portion of greater width than its ends; adjustable pivoting means; means for adjustably supporting said pivoting means to a plow structure to incline said guide obliquely forward, inward toward the plow beam and downward with its bottom edge, on the side adjacent the plow moldboard, approximately parallel to the vertical portion of the same, and to so position said guide as to make substantially shearing contact with the surface of a furrow slice turned by the plow bottom, and the rearmost portion of said guide being extended beyond the rear of the moldboard.

LEONARD G. SCHOENLEBER.
ARCHIE H. GLAVES.